United States Patent
Zegelin et al.

(10) Patent No.: US 6,909,399 B1
(45) Date of Patent: Jun. 21, 2005

(54) LOCATION SYSTEM WITH CALIBRATION MONITORING

(75) Inventors: Chris Zegelin, San Jose, CA (US); David P. Goren, Smithtown, CA (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

(21) Appl. No.: 10/750,111

(22) Filed: Dec. 31, 2003

(51) Int. Cl.$^7$ .................................................. G01S 3/02
(52) U.S. Cl. ...................................... 342/463; 455/456.1
(58) Field of Search ............................ 342/44, 51, 386, 342/463, 464, 465; 455/456.1, 457

(56) References Cited

U.S. PATENT DOCUMENTS 6,483,461 B1 * 11/2002 Matheney et al. .......... 342/463
6,542,083 B1 *  4/2003 Richley et al. ......... 340/825.49
6,708,879 B2 *  3/2004 Hunt .......................... 235/385

OTHER PUBLICATIONS

Copending U.S. Appl. No. 09/528,697 filed Mar. 17, 2000. *Enhancements to the User Location and Tracking System*, by Paramvir Bahl and Venkata N. Padmanabhan, Microsoft Technical Report MSR–TR–99–12, dated Feb. 1999, published by Microsoft Research.

*User Location and Tracking in an In–Building Radio Network*, by Paramvir Bahl and Venkata N. Padmanabhan, Microsoft Technical Report MSR–TR–99–12, dated Feb. 1999, by the same authors, published by Microsoft Research.

* cited by examiner

*Primary Examiner*—Dao Phan
(74) *Attorney, Agent, or Firm*—Baker Botts LLP

(57) ABSTRACT

A radio signal based object location system is provided wherein location devices are provided on articles for use in locating the articles, and wherein a database is maintained relating characteristics of radio signal transmissions between the location devices and fixed devices to locations within an area. A method is provided for maintaining the database to reflect propagation conditions. Location devices are provided at fixed positions within the area. Data representing radio signal transmission characteristics between the fixed position location devices and fixed devices is recorded. Transmissions between the fixed position location devices and the fixed devices is monitored to determine changes in the characteristics of radio signal transmissions from the recorded data.

9 Claims, 1 Drawing Sheet

LOCATION SYSTEM WITH CALIBRATION MONITORING

BACKGROUND OF THE INVENTION

The present invention relates to systems for locating items. In particular the invention relates to systems for locating items based on radio signals transmitted to or from transceivers provided on the items.

The use of mobile data communications systems to perform location functions for locating mobile units is described in articles entitled *Enhancements to the User Location and Tracking System*, by Paramvir Bahl and Venkata N. Padmanabhan, and *User Location and Tracking in an In-Building Radio Network*, Microsoft Technical Report MSR-TR-99-12, dated February 1999, by the same authors, both published by Microsoft Research. As described therein signal strength of signals of the wireless data communications system, such as a system using the protocol of IEEE Standard 802.11, are used for locating mobile units within an area serviced by the system. Other techniques for locating mobile units using the wireless data communications systems or other location system are possible.

In co-pending application Ser. No. 09/528,697, filed Mar. 17, 2000, which is owned by the assignee of the present application and incorporated herein by reference, there is described a system which follows the protocol of IEEE Standard 802.11, but which uses a combination of RF Ports and Cell Controllers to perform the functions of Access Points of a classical 802.11 data communications system. Lower level MAC functions are performed by the RF Ports and higher level MAC functions, including association and roaming functions, are performed by the cell controller. The term "access point" as used herein is intended to include conventional access points, such as those which follow the protocol of IEEE Standard 802.11 and perform all MAC functions, as well as RF Ports operating with cell controllers, as described in the incorporated co-pending application.

Similar systems may be implemented wherein objects are located using RFID tags applied to the items, which are interrogated by RFID readers associated with access points of an IEEE Standard 802.11 system for locating the items.

Such location systems require calibration of the radio characteristics of the area to be serviced. This can be performed by an initial radio survey of the area where a transmitter or receiver is placed at known locations in the area, and the signal characteristics for that location are determined. A location database is generated by extrapolating or interpolating the measured locations to unmeasured locations to enable location of an item at an unknown location to be determined using signal characteristics.

Industrial facilities, hospitals, universities, and the like, are rarely static, and frequent changes in the location of equipment, on a temporary or permanent basis, can change the radio signal characteristics by introducing blockage and multipath conditions. Frequently walls are erected or removed also changing the signal environment.

It is an object of the present invention to provide a system and method for determining changed signal conditions in a radio based location system.

SUMMARY OF THE INVENTION

The present invention is used in a radio signal based object location system wherein location devices are provided on articles for use in locating the articles, and wherein a database is maintained relating characteristics of radio signal transmissions between the location devices and fixed devices to locations within an area. In accordance with the invention there is provided a method for maintaining the database to reflect propagation conditions. Location devices are provided at fixed positions within the area. Data representing radio signal transmission characteristics between the fixed position location devices and the fixed devices is recorded. Transmissions between the fixed position location devices and the fixed, devices are monitored to determine changes in the characteristics of radio signal transmissions from the recorded data.

The location devices provided on items and at fixed positions may be RFID tags or WLAN transmitters or transreceivers, such as IEEE Standard 802.11 transreceivers. In the case of IEEE Standard 802.11 transmitters the fixed position location devices need only transmit a fixed signal, such as a transmitter identification signal. When it is determined that radio signal characteristics for signals between the fixed position location devices and the fixed devices have changed, the database may be corrected to reflect signal characteristic changes.

For a better understanding of the present invention, together with other and further objects thereof, reference is made to the following description, taken in conjunction with the accompanying drawings, and its scope will be pointed out in the appended claims.

DESCRIPTION OF THE INVENTION

Figure 1:
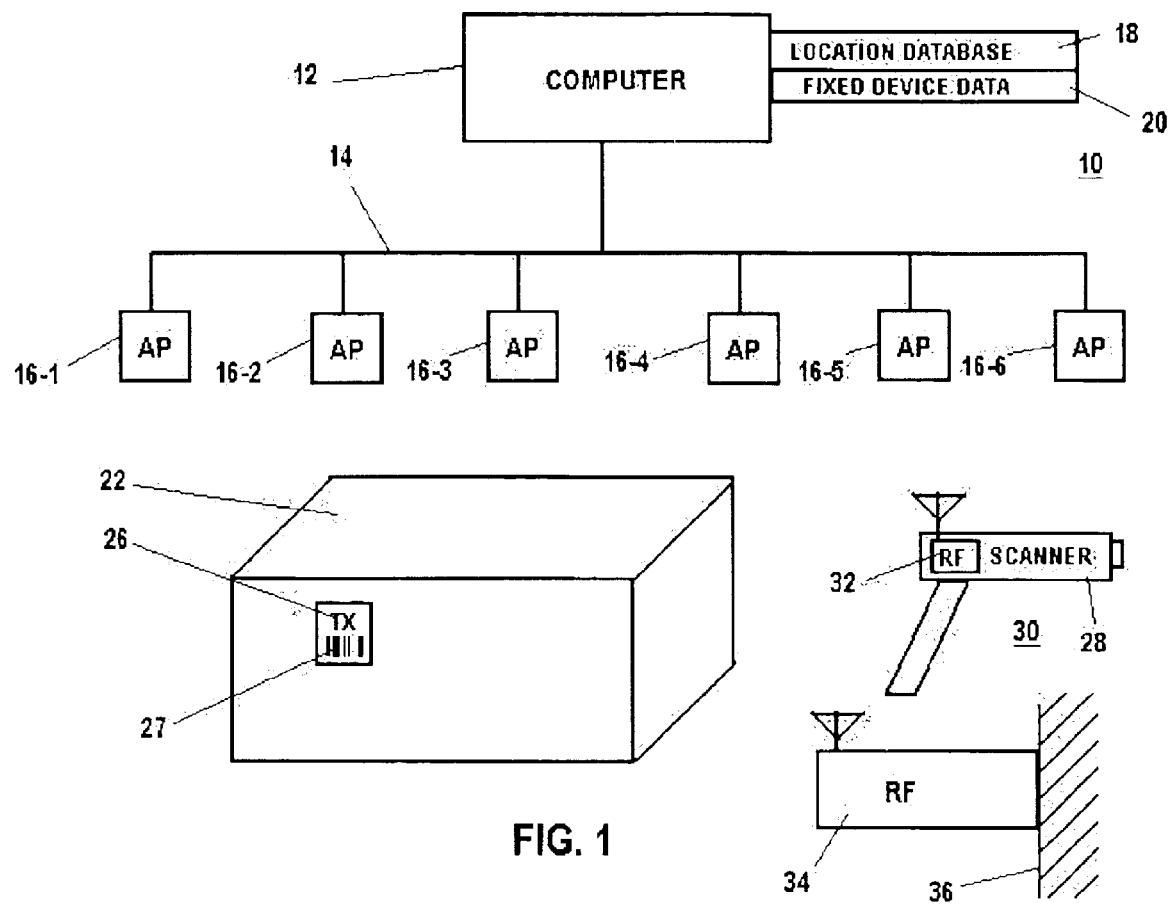
FIG. 1 is a schematic representation of a system in accordance with the present invention.

Referring to FIG. 1 there is shown a system 10 for practicing the method of the present invention. The system is useful in industrial, medical or educational facilities, and the like, for locating items, such as equipment, packages and even portable telephones carried by people. The system includes a computer 12 which is connected over a wired network 14 to a plurality of access points 16-1 to 16-6 by which wireless data communications with mobile units can be conducted. Access points may also be connected to the network 14 by wireless connection, such as by communicating with a wire connected access point or other radio device. The access points are collectively referred to by reference numeral 16. In addition to providing mobile data communications, the system of FIG. 1 also includes provisions for locating mobile units, such as mobile unit 30, and other devices such as location device 26 on package 22. Location can be provided using a data communications network, such as an 802.11 network as described in the referenced articles. The location may be determined for example by measuring the signal strength for transmissions between a mobile unit and a plurality of access points and comparing the measured signal strength to a database 18 relating signal strength to location.

Similarly, a system may be provided for locating items by providing RFID tags on the items and interrogating the RFID tags using fixed location RFID interrogators. Such systems may be used for locating items in connection with the method of the present invention. For example a package 22 or portable device 30, or both, may include an RFID tag 26, which can be located by fixed RFID interrogators.

Figure 2:
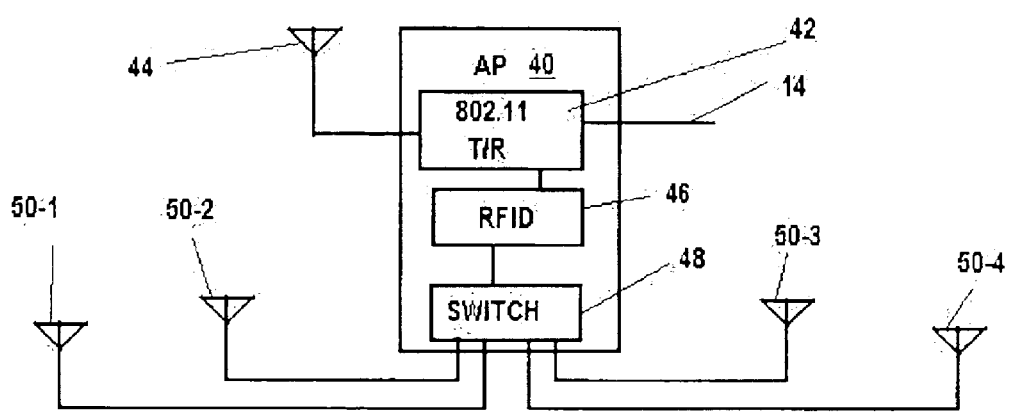
FIG. 2 is a block diagram of an access point having RFID readers useful in connection with the practice of the present invention.

FIG. 2 illustrates an access point configuration 40. The access point supports IEEE Standard 802.11 communications using an 802.11 system 42, which is interfaced to computer 12 using wired network 14. Access point 40 further supports location of RFID tags, which may be placed on items to be located, such as transmitter 26. Access point 40 includes an RFID interrogator 46 which is connected by switch 48 to a plurality of distributed antennas 50-1 through 50-4. An RFID tag to be located can be interrogated using the distributed antennas from one or more access points 40 to locate the tag.

When such location systems are initially installed, the signal characteristics of the facility are calibrated, for example, by moving a location device to known positions within the facility and recording the radio signal characteristics of signals sent to or received from the locating device by the access points 16 of the system. These signal characteristics for known locations are used to create a location database 18, which is subsequently used to locate location devices at unknown locations by comparing the signal characteristics for signals to or from the devices to the signal characteristics recorded in database 18 for known locations determined in the calibration survey.

In accordance with the invention there are provided additional location devices 34 at fixed locations, such as attached to a wall 36. These additional location devices are similar to other location devices, according to the location system being used. For example, if location is determined based on signals from RFID tags, the fixed location devices 34 would be RFID tags. Where location is determined based on WLAN transmissions, the fixed location devices 34 would be corresponding WLAN transmitters or transceivers. Where location is determined using signals sent from location devices to access points, the fixed location devices 34 can be transmitted, and would not require the functionality to conduct WLAN data communications as would a mobile unit 30. In that case the fixed location devices would merely transmit an identifying fixed message from which the access points 16 of the system could identify the unit and measure its signal characteristics.

Alternately in a WLAN configuration location, of a device can be determined on the basis of signals received by the location device from the access points, and possibly other transmitters at fixed locations that are provided only for the location function. In this case, the fixed location devices 34 include transceivers which receive signals from fixed devices, such as access points 16, such as access point beacon signals, determine the signal characteristics of the received signals, such as using the RSSI function of IEEE Standard 802.11 receivers, and send a message to an associated access point 16 with data representing the measured signal characteristics.

The system 10 records in data base 20 the transmission characteristics of the fixed location devices and their known locations, for example, at the time the system is installed or at the time the fixed position devices 34 are installed. Thereafter the signal characteristics for the fixed position devices 34 are periodically determined and compared to the fixed device data 20 stored by computer 12. If the signal characteristics have changed from the calibration values, the system is alerted that the radio environment has changed.

A change in the radio environment can be of either a temporary or permanent nature. For example, a truck may be located in the facility and create a change in the environment of a temporary nature, as may a temporarily positioned pallet of goods. On the other hand, a wall may have been installed in the facility that creates a permanent change in the radio environment. Accordingly, it is appropriate not to initiate changes to the location database 18 until it is evident that a change is of a permanent nature.

One way to correct the location database for changed conditions, is to delay any changes for a period of time, such as four or five days and implement changes to the location calibration data only after the change has persisted for a period that represents a permanent change. Another way is to implement calibration changes to the location database 18 in a gradual manner, such as by making a 10% correction in the calibration data each 24 hour period. In this manner, the change is gradually implemented and corrects itself if the change in environment is removed. Advantageously, the original characteristic data for a fixed location device is maintained in the fixed device data, so that if the signal characteristics return to their original values, the original calibration can be restored.

Another approach is for the computer 12 to generate a message to the system operator alerting the operator of a change in the radio environment. The system operator can then instruct the system to ignore a temporary change or to re-calibrate to the current environment. Alternately the system operator can undertake a new calibration of the surrounding area where a significant permanent structural change has occurred.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

We claim:

1. In a radio signal based object location system wherein location devices are provided on articles for use in locating said articles, and wherein a database is maintained relating characteristics of radio signal transmissions between said location devices and fixed devices to locations within an area, a method for maintaining said database to reflect propagation conditions, comprising providing location devices at fixed positions within said area, recording data representing radio signal transmission characteristics between said fixed position location devices and said fixed devices, and monitoring transmissions between said fixed position location devices and said fixed devices to determine changes in said characteristics of radio signal transmissions from said recorded data.

2. A method as specified in claim 1 wherein said location devices provided on articles are RFID tags, and wherein providing location devices at fixed locations comprises providing RFID tags at fixed locations.

3. A method as specified in claim 1 wherein said location devices provided on articles are WLAN transmitters, and wherein providing location devices at fixed locations comprises providing WLAN transmitters at fixed locations.

4. A method as specified in claim 3 wherein said location devices provided on articles are IEEE Standard 802.11 transmitters, and wherein providing location devices at fixed locations comprises providing IEEE Standard 802.11 transmitters at fixed locations.

5. A method as specified in claim 4 wherein providing location devices at fixed locations comprises providing IEEE Standard 802.11 transmitters having a fixed transmission format at fixed locations.

6. A method as specified in claim 1 wherein when it is determined that radio signal characteristics for signals between said fixed position location devices and said fixed devices have changed, said database is corrected to reflect signal characteristic changes.

7. A method as specified in claim 1 wherein said location devices provided on articles are WLAN transceivers, and wherein providing location devices at fixed locations comprises providing WLAN transceivers at fixed locations.

8. A method as specified in claim 7 wherein said location devices provided on articles are IEEE Standard 802.11 transceivers, and wherein providing location devices at fixed locations comprises providing IEEE Standard 802.11 transceivers at fixed locations.

9. A method as specified in claim 7 wherein providing location devices at fixed locations comprises providing WLAN transceivers at fixed locations arranged to receive signals from said fixed devices, determine signal characteristics of said received signals and transmit a message to an associated fixed device having data corresponding to said signal characteristics.

* * * * *